United States Patent [19]

Reimann et al.

[11] Patent Number: 4,791,027
[45] Date of Patent: Dec. 13, 1988

[54] NYLON GRANULES HAVING AN OUTER SHELL

[75] Inventors: Horst Reimann, Worms; Franz Zahradnik, Ludwigshafen; Hans-Peter Weiss, Mutterstadt, all of Fed. Rep. of Germany

[73] Assignee: BASF Aktiengesellschaft, Rheinland-Pfalz, Fed. Rep. of Germany

[21] Appl. No.: 155,521

[22] Filed: Feb. 12, 1988

[30] Foreign Application Priority Data

Feb. 27, 1987 [DE] Fed. Rep. of Germany ....... 3706356

[51] Int. Cl.$^4$ .............................................. B32B 27/34
[52] U.S. Cl. ................................... 428/407; 524/404; 524/425; 524/514; 524/606
[58] Field of Search .......................................... 428/407

[56] References Cited

U.S. PATENT DOCUMENTS 4,704,330  11/1987  Moore et al. ..................... 428/407

FOREIGN PATENT DOCUMENTS 2829625  1/1980  Fed. Rep. of Germany .
2856457  7/1980  Fed. Rep. of Germany .
57-137325  8/1982  Japan .................................. 428/407

*Primary Examiner*—Lewis T. Jacobs
*Attorney, Agent, or Firm*—Bruce & McCoy

[57] ABSTRACT

Nylon granules are based on
(A) from 20 to 99.99% by weight of a nylon,
(B) from 0 to 60% by weight of fibrous or particulate fillers or a mixture thereof and
(C) from 0 to 40% by weight of an impact modifying rubber and contain
(D) from 0.01 to 1% by weight of an outer shell consisting of a mixture of
   ($d_1$) zinc stearate or aluminum stearate or a mixture thereof,
   ($d_2$) calcium stearate and
   ($d_3$) an ester of an aliphatic carboxylic acid of 6 to 24 carbon atoms with an aliphatic saturated alcohol of 2 to 24 carbon atoms.

4 Claims, No Drawings

NYLON GRANULES HAVING AN OUTER SHELL

The present invention relates to nylon granules based on
- (A) from 20 to 99.99 % by weight of a nylon,
- (B) from 0 to 60% by weight of fibrous or particulate fillers or a mixture thereof and
- (C) from 0 to 40% by weight of an impact modifying rubber and containing
- (D) from 0.01 to 1% by weight of an outer shell consisting of a mixture of
  - ($d_1$) zinc stearate or aluminum stearate or a mixture thereof,
  - ($d_2$) calcium stearate and
  - ($d_3$) an ester of an aliphatic carboxylic acid of 6 to 24 carbon atoms with an aliphatic saturated alcohol of 2 to 24 carbon atoms.

The present invention furthermore relates to the use of the nylon granules for the production of moldings and to moldings obtainable from these granules.

Nylons which are processed to moldings by injection molding generally contain lubricants to improve the feed and mold release behavior. These can either be incorporated into the polymers or applied to the surface of the polymer granules. Surface application has the advantage that it can be carried out without melting the nylon. However, the amount applied is generally restricted, owing to the danger of separation; moreover, especially when powder lubricants are applied by tumbling, difficulties are encountered in the pneumatic charging of injection molding machines since the powder does not adhere firmly to the granules and therefore produces dust.

DE-A No. 28 56 457 discloses nylon granules which are coated on the surface with from 0.01 to 1% by weight of an ester of an aliphatic saturated carboxylic acid and an aliphatic saturated alcohol from an aqueous dispersion. Coating from aqueous dispersion results in better adhesion of the lubricant to the nylon granules, thus reducing the problems of dust formation during processing.

DE-A No. 28 29 625 discloses nylon granules which are coated from aqueous dispersion in a manner similar to that described in DE-A No. 28 56 457. In this application, a paraffin is used as the coating agent.

Both products stated above have in principle the disadvantage that, when coating is carried out from aqueous dispersion, the water must be removed again when coating is complete, and that in general the cycle times achievable in injection molding are not completely satisfactory.

It is also known that zinc stearate can be applied in the form of a melt to the surface of nylon granules. However, this generally produces spatter on the surface of the moldings, which is unacceptable.

Although the danger of formation of spatter on the surface of moldings can be reduced by using calcium stearate instead of zinc stearate, calcium stearate has a high melting point and is therefore difficult to apply from the melt onto the nylon granules.

It is an object of the present invention to provide nylon granules which have an outer lubricant coating, are easy to prepare and, after coating, can be further processed to moldings without difficulties by injection molding.

We have found that this object is achieved, according to the invention, by the nylon granules defined at the outset.

The novel granules contain a nylon as component (A). The granules are preferably cylindrical or lens-shaped and have a diameter of about 1-6 mm and a length of about 2-8 mm.

The nylons are partially crystalline or amorphous nylons which can be prepared, for example, by condensation of equimolar amounts of a saturated dicarboxylic acid of 4 to 12 carbon atoms with a diamine of 4 to 14 carbon atoms. Other suitable nylons are obtainable, for example, by condensation of ω-aminocarboxylic acids or by polyaddition of lactams.

Adipic acid, azelaic acid, sebacic acid, dodecanedioic acid and terephthalic acid are examples of dicarboxylic acids and hexamethylenediamine, trimethylhexamethylenediamine, di-(4-aminocyclohexyl)-methane and 2,2-di-(4'-aminocyclohexyl)-propane are examples of diamines. Furthermore, nylon copolymers which are obtained by polycondensation of lactams together with the abovementioned dicarboxylic acids and diamines, and blends of various nylons, are in principle suitable.

Examples of such nylons are polycaprolactam, polyhexamethyleneadipamide, polyhexamethylenesebacamide, polylaurolactam, polyhexamethylenedodecanediamide and polyhexamethylenesebacamide.

The nylons generally have a relative viscosity of from 2.5 to 5, determined on a 1% strength solution in concentrated sulfuric acid at 23° C., which corresponds roughly to a weight average molecular weight of from 5,000 to 45,000.

The proportion of nylon A in the novel granules is from 20 to 99.99, preferably from 40 to 95, in particular from 50 to 90, % by weight.

The novel granules can contain, as component B, up to 60% by weight of fibrous or particulate fillers or a mixture of these. Examples of fillers are asbestos, carbon, glass fibers in the form of woven glass fabrics, glass mats, surface mats or glass rovings, wollastonite, calcium, carbonate, glass spheres, powdered quartz, silicon nitride, boron nitride and mixtures thereof.

The proportion of the fillers is from 0 to 60, preferably from 2 to 50, in particular from 5 to 40, % by weight, based on the total weight of the granules.

The novel granules can contain, as a further component (C), an impact modifying rubber in amounts of up to 40, preferably from 2 to 40, in particular from 4.9 to 30, % by weight.

Elastomers based on ethylene, propylene, butadiene or acrylate or a mixture thereof may be mentioned merely as examples of impact modifying rubbers.

Polymers of this type are described in, for example, Houben-Weyl, Methoden der organischen Chemie, Vol. 14/1 (Georg-Thieme-Verlag, Stuttgart, 1961), pages 392-406 and the monograph by C. B. Bucknall, Toughened Plastics (Applied Science Publishers, London, 1977).

A few preferred types of such elastomers are described below.

A first preferred group comprises the ethylene/propylene (EPM) and ethylene/propylene/diene (EPDM) rubbers, which preferably have a ratio of ethylene radicals to propylene radicals of from 40:60 to 65:35.

The Mooney viscosities (MLI+4/100° C.) of such uncrosslinked EPM and EPDM rubbers (gel contents in general less than 1% by weight) are preferably from 25 to 100, in particular from 35 to 90 (measured using the large rotor after a running time of 4 minutes at 100° C. according to DIN 53,523).

EPM rubbers generally have virtually no double bonds, whereas EPDM rubbers may contain from 1 to 20 double bonds per 100 carbon atoms.

Examples of diene monomers for EPDM rubbers are conjugated dienes, such as isoprene and butadiene, nonconjugated dienes of 5 to 25 carbon atoms, such as 1,4butadiene, 1,4-hexadiene, 1,5-hexadiene, 2,5-dimethyl-1,5-hexadiene and 1,4-octadiene, cyclic dienes, such as cyclopentadiene, cyclohexadiene, cyclooctadiene and dicyclopentadiene, and alkenylnorbornenes, such as 5-ethylidene-2-norbornene, 5-butylidene-2-norbornene, 2-methallyl-5-norbornene, 2-isopropenyl-5-norborene, and tricyclodienes, such as 3-methyltricyclo(5.2.1.0.2.6)-3,8-decadiene, and mixtures thereof. 1,5-Hexadiene, 5ethylidenenorbornene and dicyclopentadiene are preferred. The diene content of the EPDM rubbers is preferably from 0.5 to 10, in particular from 1 to 8, % by weight, based on the total weight of the rubber.

EPM and EPDM rubbers can also be grafted with reactive carboxylic acids or their derivatives. Acrylic acid, methacrylic acid and their derivatives and maleic anhydride may be mentioned here merely as typical examples.

Another group of preferred rubbers comprises copolymers of ethylene with acrylates and/or methacrylates, in particular those which additionally contain epoxy groups. These epoxy groups are preferably incorporated into the rubber by adding, to the monomer mixture, monomers which contain epoxy groups and are of the general formula II or III

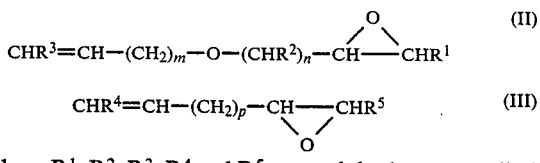

where $R^1$, $R^2$, $R^3$, $R^4$ and $R^5$ are each hydrogen or alkyl of 1 to 6 carbon atoms, m is an integer from 0 to 20, n is an integer from 0 to 10 and p is an integer from 0 to 5.

$R^1$, $R^2$ and $R^3$ are each preferably hydrogen, m is preferably 0 or 1 and n is preferably 1. The corresponding compounds are alkyl glycidyl ethers or vinyl glycidyl ethers.

Examples of preferred compounds of the formula II are esters of acrylic acid and/or methacrylic acid which contain epoxy groups, glycidyl acrylate and glycidyl methacrylate being particularly preferred among these.

The ethylene content of the copolymers is in general from 50 to 98% by weight, and the content of monomers containing epoxy groups and that of the acrylate and/or methacrylate are each from 1 to 49% by weight.

Particularly preferred copolymers are those conisting of from 50 to 98, in particular from 60 to 95, % by weight of ethylene, from 1 to 40, in particular from 2 to 20, % by weight of glycidyl acrylate and/or glycidyl methacrylate, and from 1 to 45, in particular from 10 to 35, % by weight of n-butyl acrylate and/or 2-ethylhexyl acrylate.

Other preferred esters of acrylic and/or methacrylic acid are the methyl, ethyl, propyl, isobutyl and tert-butyl esters.

Vinyl esters and vinyl ethers can also be used as comonomers.

The ethylene copolymers described above can be prepared by a conventional process, preferably by random copolymerization under high pressure and at elevated temperatures. Appropriate processes are described in the literature.

The melt flow index of the ethylene copolymer is in general from 1 to 80 g/10 min (measured at 190° C. and under a load of 2.16 kg).

Other preferred elastomers (rubbers) D) are graft copolymers with butadiene, butadiene/styrene, butadiene/acrylonitrile and acrylates, as described in, for example, DE-A- No. 16 94 173 and DE-A- No. 23 48 377.

Particular examples of these are the ABS polymers, as described in DE-A-20 35 390, DE-A-No. 22 48 242 and EP-A-No. 22 216, those described in the last-mentioned publication being particularly preferred.

Other suitable rubbers (D) which can be used are graft polymers of from 25 to 98% by weight of an acrylate rubber having a glass transition temperature of less than −20° C., as the grafting base, and from 2 to 75% by weight of a copolymerizable ethylenically unsaturated monomer whose homopolymers and copolymers have a glass transition temperature higher than 25° C., as the graft.

The grafting bases are acrylate or methacrylate rubbers, and up to 40% by weight of other comonomers may be present. The $C_1$–$C_8$-esters of acrylic acid or methacrylic acid and their halogenated derivatives as well as aromatic acrylates and mixtures of these are preferred. Acrylonitrile, methacrylonitrile, styrene, α-methyl-styrene, acrylamides, methacrylamides and vinyl -$C_1$–$C_6$-alkyl ethers may be mentioned as comonomers in the grafting base.

The grafting base can be uncrosslinked or partially or completely crosslinked. Crosslinking is achieved by copolymerization of, preferably, from 0.02 to 5, in particular from 0.05 to 2, % by weight of a crosslinking monomer having more than one double bond. Suitable crosslinking monomers are described in, for example, DE-A-No. 27 26 256 and EP-A-No. 50 265.

Preferred crosslinking monomers are triallyl cyanurate, triallyl isocyanurate, triacryloylhexahydro-s-triazine and trialkylbenzenes.

If the crosslinking monomers have more than 2 polymerizable double bonds, it is advantageous to restrict their amount to no more than 1% by weight, based on the grafting base.

Particularly preferred grafting bases are emulsion polymers having a gel content of more than 60% by weight (determined in dimethylformamide at 25° C. according to M. Hoffmann, H. Krömer and R. Kuhn, Polymeranalytik, Georg-Thieme-Verlag, Stuttgart, 1977).

Other suitable grafting bases are acrylate rubbers having a diene core, as described in, for example, EP-A-No. 50 262.

Particularly suitable graft monomers are styrene, α-methylstyrene, acrylonitrile, methacrylonitrile and methyl methacrylate and mixtures of these, in particular those of styrene and acrylonitrile in a weight ratio of from 90:10 to 50:50.

The grafting yield, ie. the quotient of the amount of grafted monomer and the amount of graft monomer used, is in general from 20 to 80%.

Acrylate-based rubbers which can be used according to the invention are described in, for example, DE-A-No. 24 44 584 and DE-A-No. 27 26 256.

The rubbers C preferably have a glass transition temperature of less than −30° C., in particular less than −40° C., which leads to good impact strength even at low temperatures.

It is of course also possible to use blends of the above-mentioned types of rubbers.

An essential component of the novel granules is the outer shell D) consisting of from 0.01 to 1.0% by weight of zinc stearate or aluminum stearate or a mixture thereof ($d_1$), calcium stearate ($d_2$) and an ester of an aliphatic carboxylic acid of 6 to 24 carbon atoms with an aliphatic saturated alcohol of 2 to 24 carbon atoms ($d_3$).

Preferably used mixtures are those in which the weight ratio of the components $d_1$ to $d_2$ is from 3:7 to 7:3, in particular from 4:6 to 6:4, and the weight ratio of the sum of components $d_1$ and $d_2$ to component $d_3$ is from 3:7 to 7:3.

If a mixture of zinc stearate and aluminum stearate is used as component $d_1$), their weight ratio is ir general fro 1:10 to 10:1.

Component $d_3$) is an ester of an aliphatic, preferably monobasic or dibasic carboxylic acid of 6 to 24 carbon atoms with an aliphatic saturated, preferably monohydric to tetrahydric alcohol of 2 to 24 carbon atoms. Examples of carboxylic acids are pelargonic acid, palmitic acid, lauric acid, margaric acid, adipic acid and dodecanedioic acid, as well as stearic acid, which is generally preferred.

Examples of alcohols are n-butanol, n-octanol, stearyl alcohol, ethylene glycol, neopentyl glycol, glycerol and pentaerythritol, stearyl alcohol and glycerol being generally preferred.

From the above, it can be seen that particularly preferred esters are stearyl stearate and glycerol monostearate.

The proportion of the outer shell is from 0.01 to 1, preferably from 0.02 to 0.8, in particular fron 0.05 to 0.5, % by weight, based on the total weight of the granules.

The outer shell can advantageously be applied by appling the melt of the mixture of components ($d_1$) to ($d_3$) directly to the nylon granules in an offset rotary tumbler or another apparatus conventionally used for such processes. The temperatures of the granules are in general from 90° to 120° C., preferably from 100° to 120° C.

The novel nylon granules have a number of noteworthy advantages over the prior art granules provided with an outer shell for lubrication.

On the one hand, within the stated composition ranges, the mixtures of components ($d_1$) to ($d_3$) have lower melting points than each of the components alone or than mixtures of only 2 out of the 3 components. This makes it possible to reduce the temperature of the nylon granules during application of the coating, with the result that the danger of sticking and the formation of lumps of lubricant are substantially reduced.

Furthermore, because of the low viscosity of the melt at such low temperatures, very uniform coating of the ranules is possible and caking in the product lines is very substantially avoided. Such sticking and caking is frequently observed, for example, when mixtures of zinc stearate and stearyl stearate are used.

Furthermore, the viscosity of the mixtures used for coating is already very low even at temperatures below 110° C., in particular below 100° C., permitting uniform coating of the granules at low temperatures.

Another advantage is that the cycle times during processing of the novel granules, for example by injection molding, can be substantially reduced compared with the known granules. The moldings obtainable from the granules have a very good surface structure.

EXAMPLES 1 TO 9

Mixtures of zinc stearate ($d_1$), calcium stearate ($d_2$) and stearyl stearate ($d_3$) were prepared, and the melting points and properties of the melt were determined and compared with those of binary mixtures of two of the components.

| Example | Component (% by wt.) $d_1$ | $d_2$ | $d_3$ | Melting point °C. | Properties |
|---|---|---|---|---|---|
| 1V | 50 | 50 | — | 108 | Viscous, difficult to apply to granules |
| 2V | 50 | — | 50 | 114 | Tends to form streaks |
| 3V | — | 50 | 50 | 117 | Viscous |
| 4 | 21 | 49 | 30 | 109 | Low viscosity, clear, no streak formation |
| 5 | 28 | 42 | 30 | 103 | Low viscosity, clear, no streak formation |
| 6 | 24 | 36 | 40 | 105 | Low viscosity, clear, no streak formation |
| 7 | 35 | 35 | 30 | 99 | Low viscosity, clear, no streak formation |
| 8 | 25 | 25 | 50 | 93 | Low viscosity, clear, no streak formation |
| 9 | 15 | 15 | 70 | 99 | Low viscosity, clear, no streak formation |

The low melting points and the advantageous properties of the ternary mixtures used for the preparation of the novel granules are clearly evident from the results.

EXAMPLE 10

Polyhexamethyleneadipamide ($A_1$) and polycaprolacta ($A_2$) in the form of cylinders of 3 mm diameter and 4 m length were coated with the coating agents stated in Table 2. Coating was carried out with the aid of an offset rotary tumbler, in which the melt of the coating agent was applied to the granules.

The coated granules were processed to vacuum cleaner covers in a screw injection molding machine (screw diameter 52 mm). The following injection molding conditions were chosen:

Melt temperature: 290° C.
Mold temperature: 60° C.
Injection pressure: 320 bar ($3.2 \times 10^7$ Pa)

The shortest possible cycle times are shown in Table 2.

TABLE 2

| Example | Nylon | Coating agent | Amount % by wt. | Coating temperature °C. | Cycle time sec |
|---|---|---|---|---|---|
| 10* | $A_1$ | Paraffin | 0.2 | | 48 |
| 11 | $A_1$ | Stearyl stearate | 0.08 | | 45 |
| 12 | $A_1$ | Zn stearate | 0.05 | | 71 |
| 13 | $A_1$ | As in Example 9 | 0.14 | | 38 |

*The paraffin was applied from aqueous dispersion according to Example 3 of DE-A-28 29 625.

The results in Table 2 show that the novel granules are coated at lower temperatures and can be processed in substanially shorter cycle times by injection molding.

We claim:

1. Nylon granules based on
   (A) from 20 to 99.99% by weight of a nylon,
   (B) from 0 to 60% by weight of fibrous or particulate fillers or a mixture thereof and
   (C) from 0 to 40% by weight of an impact modifying rubber and containing
   (D) from 0.01 to 1% by weight of an outer shell consisting of a mixture of
      ($d_1$) zinc stearate or aluminum stearate or a mixture of these,
      ($d_2$) calcium stearate and
      ($d_3$) an ester of an aliphatic carboxylic acid of 6 to 24 carbon atoms with an aliphatic saturated alcohol of 2 to 24 carbon atoms 2. Nylon granules as claimed in claim 1, wherein the weight ratio of $d_1$ to $d_2$ is from 3:7 to 7:3 and the weight ratio of ($d_1+d_2$) to $d_3$ is from 3:7 to 7:3.

3. Nylon granules as claimed in claim 2, wherein the weight ratio of $d_1$ to $d_2$ is from 4:6 to 6:4.

4. A molding obtainable from nylon granules as claimed in claim 1.

* * * * *

UNITED STATES PATENT AND TRADEMARK OFFICE
CERTIFICATE OF CORRECTION

PATENT NO. : 4,791,027
DATED : Dec. 13, 1988
INVENTOR(S) : Horst REIMANN et al.

It is certified that error appears in the above-identified patent and that said Letters Patent is hereby corrected as shown below:

On the Title Page:

The "Attorney, Agent, or Firm " is incorrect; should read as follows:

-- Oblon, Fisher, Spivak, McClelland & Maier --

Signed and Sealed this

Fourth Day of July, 1989

*Attest:*

DONALD J. QUIGG

*Attesting Officer*  *Commissioner of Patents and Trademarks*